Feb. 6, 1923.　　　　　　　　　　　　　　　　　　　　　　　　1,444,080
E. NYMAN.
GAUGE TOOL FOR USE IN LATHES.
FILED OCT. 20, 1921.
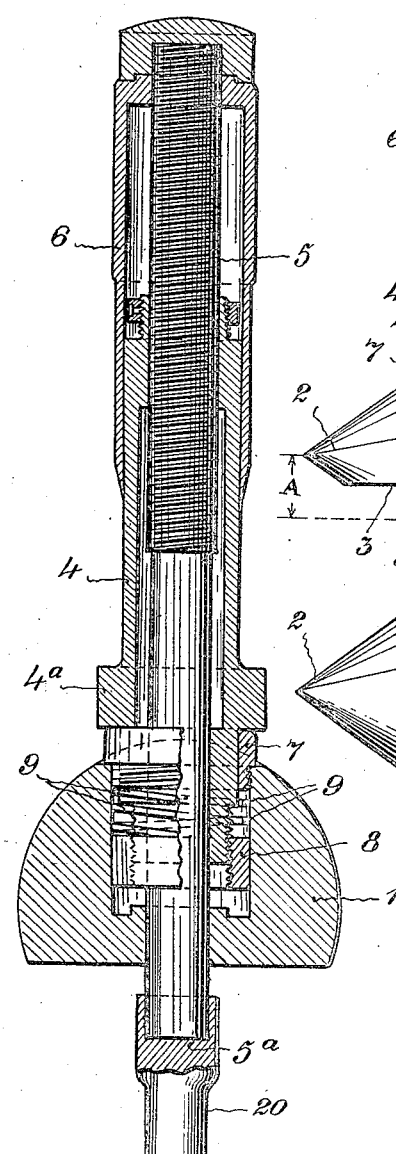
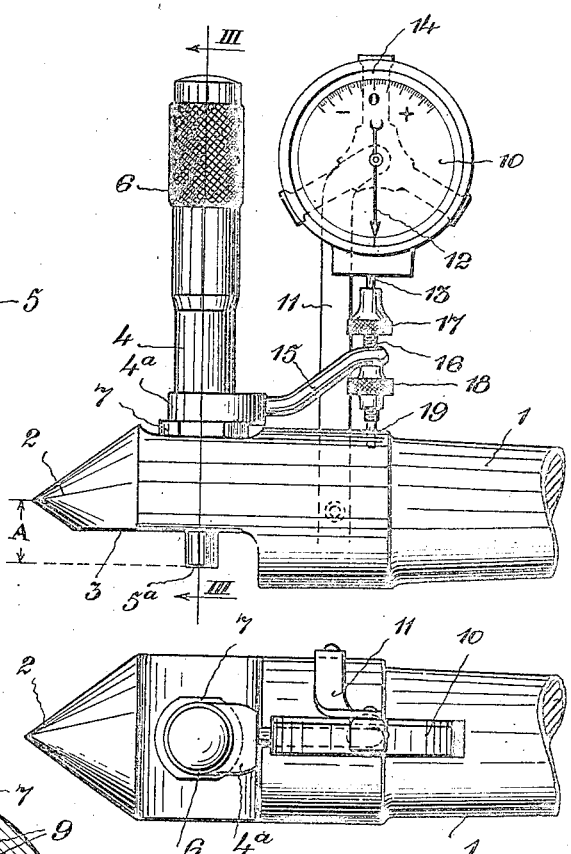
Inventor:
Emil Nyman
By
Attorney.

Patented Feb. 6, 1923.

1,444,080

UNITED STATES PATENT OFFICE.

EMIL NYMAN, OF SVEDALA, SWEDEN.

GAUGE TOOL FOR USE IN LATHES.

Application filed October 20, 1921. Serial No. 509,133.

*To all whom it may concern:*

Be it known that I, EMIL NYMAN, a citizen of Sweden, and residing at Svedala, in the county of Malmohus, Kingdom of Sweden, have invented a new and useful Gauge Tool for Use in Lathes, of which the following is a specification.

My invention relates to a gauge tool intended for use in lathes for the purpose of determining the feeding movement of the cutting tool and thereby the diameter of the work piece to be turned. The instrument in question is intended to be arranged upon the tail-stock of the lathe and combined with the centre located therein, said centre usually being removable so that the instrument may easily be arranged upon lathes already in use or shifted from one lathe to another or removed for protecting it from damages when not in use.

The instrument is based upon the principle of the well known micrometer screw and the cutting tool is intended to be fed against the end of said screw, which is spring-actuated and combined with an indicator for exactly determining the actual movement of the screw so that all differences arising from the individual determination of such movement are eliminated. Besides it is possible by means of said indicator to increase the accuracy of the feeding movement and in fact the distance from the edge of the cutting tool to the centre line of the lathe may be determined up to a thousandth of an inch.

The invention is illustrated in the accompanying drawing, in which Fig. 1 shows an elevation thereof. Fig. 2 is a plan view of the same and Fig. 3 is an enlarged section along the line III—III in Fig. 1, looking in the direction of the arrows.

It is to be understood that in lathes the cutting tool is usually disposed level with the centre line of the lathe, in which case the micrometer should be horizontal. Generally the axis of the micrometer is located substantially in a plane passing through the centre line and the edge of the cutting tool, which will easily be effected by rotating movement of the head centre.

In the drawing the reference numeral 1 represents the tail-stock centre, the point of which is designated 2. In order to make it possible to use the gauge tool when turning work pieces having small diameters a part of the centre is cut away perpendicularly to the axis of the micrometer as shown at 3.

The micrometer may be of any desired type, and preferably consists of an inner sleeve 4 serving as a nut for the screw 5, to which is affixed an outer sleeve 6 serving as a head or grip for rotating the screw. The centre 1 is provided with a transverse bore, through which the end $5^a$ of the micrometer screw 5 projects, and a threaded sleeve 7 is screwed into the centre 1, said sleeve surrounding the sleeve 4 and serving as a guide therefor. A nut 8 is affixed to the end of the sleeve 4 and an expansible spring 9 is arranged between the nut 8 and the inner end of the sleeve 7. A head $4^a$ arranged upon the sleeve 4 serves to limit the movement of the whole micrometer caused by the action of the spring 9, by abutting against the outer end of the sleeve 7.

When determining the feeding movement of the cutting tool said tool is first brought into contact with the end $5^a$ of the micrometer screw; it being understood that the work piece, when turned, will have a radius corresponding to the distance A (Fig. 1) between the screw end $5^a$ and the centre line of the lathe. The screw 5 is then revolved in relation to the sleeve 4, thereby changing such distance, the numerical value of which can be read off on the micrometer device as usual. The movement of the screw, during its adjustment, takes place horizontally and in a direction at right angles to the center line of the lathe, and the tool is set by the screw, as will be apparent.

For obtaining a high degree of accuracy it is not sufficient to depend upon the individual determination of the extent of movement of the screw end $5^a$ since very small changes in said movement will cause quite different results with regard to the diameter of the work piece; and for the purpose of doing away with such individual determination of the movement in question the whole micrometer is slidable against the pressure of the spring 9, which pressure may be considered constant. To determine the extent of the sliding movement of the micrometer the indicator, described in the following, is used.

The indicator 10 is rigidly affixed to the centre 1 by means of an arm 11 and provided with a pointer 12, the normal or idle position of which is approximately the one shown in the drawing. The pointer 12 is spring actuated as common in similar measuring instruments for other purposes, so that it is automatically carried back when not acted upon. From the indicator projects a pin 13, which, when acted upon by pressure, causes the rotation of the pointer 12 and the indicator is provided with a scale for determination of the degree of rotation of the pointer 12. Said scale has a zero-line at 14 and extends in both directions from said zero-line, the one side corresponding to an addition and the other to a subtraction in relation to the measure indicated.

From the head $4^a$ or other part of the sleeve 4 there extends an arm 15, the free outer end of which serves as a nut for carrying a screw 16 provided with a head 17. The screw 16, which is placed in alignment with the pin 13, is further provided with a lock nut 18; and to prevent displacement the screw projects freely into a hole provided in the centre 1, as shown at 19.

When adjusting the gauge tool for use, screw 16 is turned and thereby presses its head 17 against the pin 13 to such an extent that the pointer 12 is carried to its idle position shown in the drawing, whereafter the screw 16 is locked by means of the nut 18. Then the distance A from the end $5^a$ of the micrometer screw to the center line of the lathe is so much greater than the measurement indicated by the micrometer that the screw 5 must be pushed inwardly against the action of the spring 9 until the pointer 12 of the indicator 10 has travelled to the zero-line 14 before exactly obtaining the measurement in question. By not pushing the micrometer screw so far inwardly or by pushing it somewhat further the very small difference in radius obtained upon the work piece may be read off by the location of the pointer in relation to the scale of the indicator.

By means of the micrometer itself an accuracy of a hundredth of an inch is obtainable and by the indicator the accuracy is increased up to one thousandth of an inch.

Since the micrometer screw has a predetermined length only, distances exceeding said length cannot ordinarly be measured; but for obtaining a broader range of action, distance pieces 20 having an exactly determined length may be inserted between the screw end $5^a$ and the edge of the cutting tool when determining its feeding movement. Such distance pieces may be provided with spring clamps or the like for securing them to the screw end $5^a$ or they may be provided with a sleeved end to fit over the screw end, as shown in the drawing. Of course loose distance pieces may also be used but they ought to be affixed to the micrometer screw by suitable means. When distance pieces are used the length of the same must be added to the measurement shown by the micrometer for obtaining the correct value of the distance A but otherwise the tool is used in the same manner as described above.

After the exact determination of the transverse feeding movement of the cutting tool, said tool is moved into contact with the work piece in the lathe and caused to act thereupon, but for preventing damage to the srew end $5^a$ or the end of the distance piece 20 the micrometer ought to be pushed by hand somewhat further inwardly against the action of the spring 9 before sliding the cutting tool in the longitudinal direction of the lathe, since otherwise scratches may arise at the end of the micrometer screw or distance piece which may impair the accuracy of adjustment.

Having now described my invention and the manner in which the same is to be used, I declare that what I claim is:—

1. A gauge tool for use in lathes, comprising a tail-stock center; a micrometer mounted in and transversely of said center; a spring acting upon the micrometer and tending to slide the same in an axial direction; means for limiting the action of the spring; and an indicator connected with the micrometer for indicating the sliding movement of the latter in relation to the tail-stock center.

2. A gauge tool of the character described, comprising a tail-stock center having a transverse bore; a micrometer screw slidably fitting in said bore; a spring within said bore acting upon said screw to cause its end to project outwardly beyond the axis of the tail-stock center; means for limiting the outward movement of the screw; and an indicator connected with the screw for the purpose of indicating its sliding movement in relation to said center.

3. A gauge tool of the character described, comprising a tail-stock center having a transverse bore; a fixed sleeve in said bore; a sleeve slidable within the fixed sleeve and having an abutment on one end; a micrometer screw adjustably positioned within said slidable sleeve and projecting through said bore; an expansible spring within said bore between the fixed sleeve and the abutment to move the slidable sleeve and the micrometer screw in a longitudinal direction; and an indicator connected with the slidable sleeve for the purpose of indicating its sliding movement in relation to the tail-stock center.

4. A guage tool of the character described, comprising a tail-stock center provided with a transverse bore and with a recess having one of its faces perpendicular to the axis of the bore; a fixed sleeve arranged within said bore; a sleeve slidable in the fixed sleeve; a micrometer screw adjustably positioned within said slidable sleeve and projecting through the bore; an abutment on the end of the slidable sleeve; an expansible spring between said abutment and the fixed sleeve to move the slidable sleeve and micrometer screw in a longitudinal direction; and an indicator connected with the slidable sleeve for the purpose of indicating its sliding movement in relation to the tail-stock center.

5. A guage tool of the character described, comprising a tail-stock center; a micrometer screw mounted in and transversely of said center; a longitudinally slidable sleeve surrounding said micrometer screw; spring means for sliding the sleeve and the micrometer screw in a longitudinal direction; means for limiting the sliding movement; an indicator for indicating the extent of said sliding movement; an adjustable abutment; and an arm affixed to the slidable sleeve adapted to act, through the adjustable abutment, upon the indicator and transmit the movement thereto.

In testimony whereof, I have signed my name to this specification in the presence of two subscribing witnesses.

EMIL NYMAN.

Witnesses:
W. V. BRANZELE,
ERNEST PERRIN.